Sept. 22, 1959 W. F. C. SCHAAP 2,905,154
VAPOUR GENERATING AND VAPOUR HEATING UNIT
Filed Jan. 12, 1954 8 Sheets-Sheet 1

Inventor
Willem F. C. Schaap
By J. P. Moran
Attorney

Inventor
Willem F. C. Schaap
By
Attorney

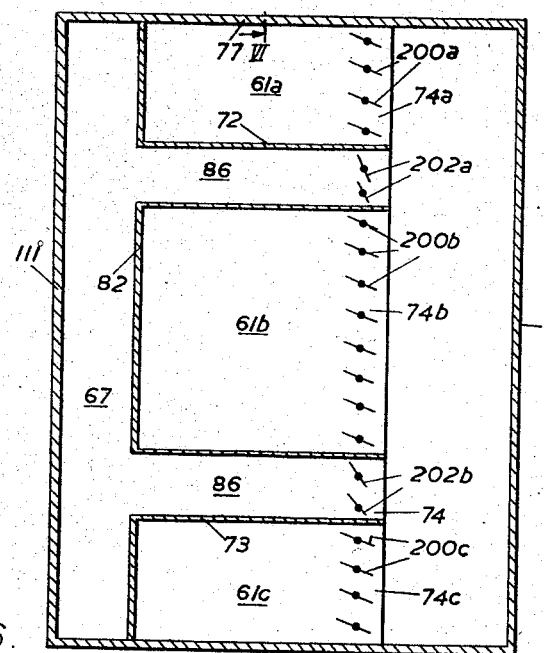
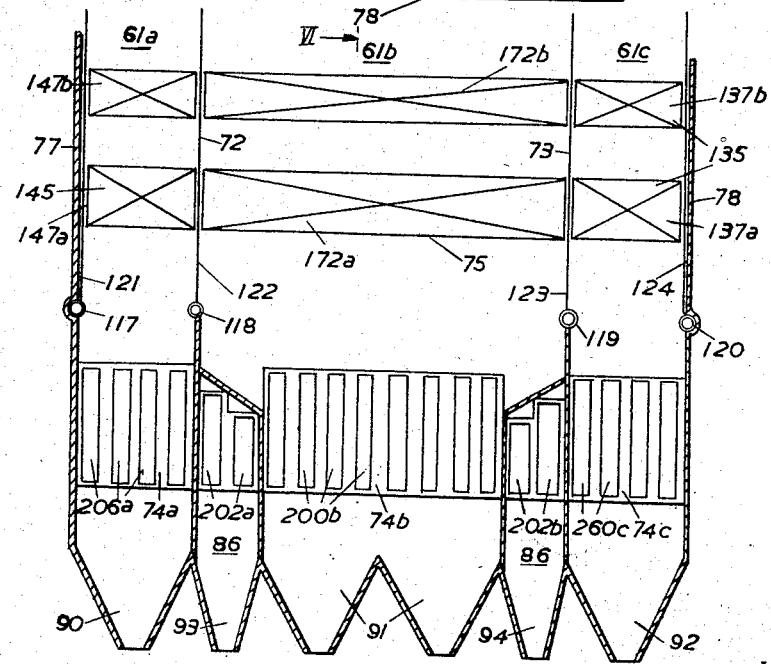

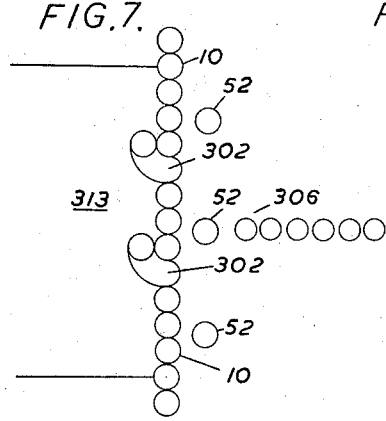
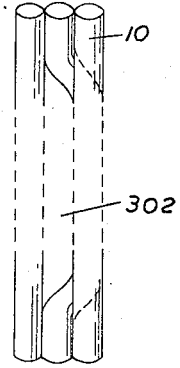
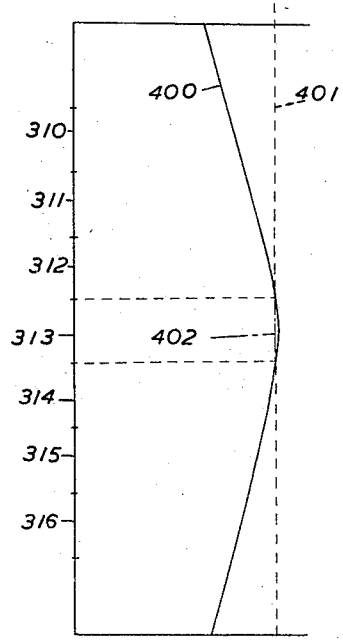
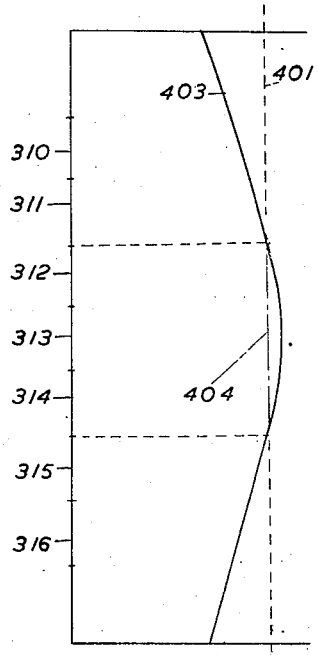

Sept. 22, 1959 W. F. C. SCHAAP 2,905,154
VAPOUR GENERATING AND VAPOUR HEATING UNIT
Filed Jan. 12, 1954 8 Sheets-Sheet 6
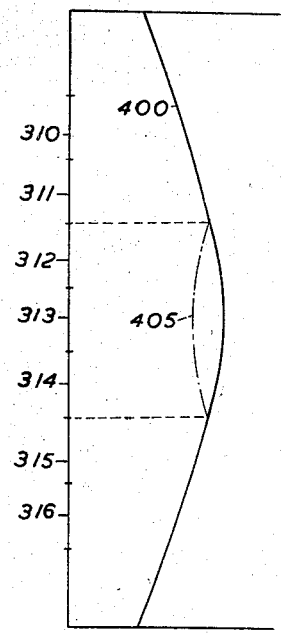
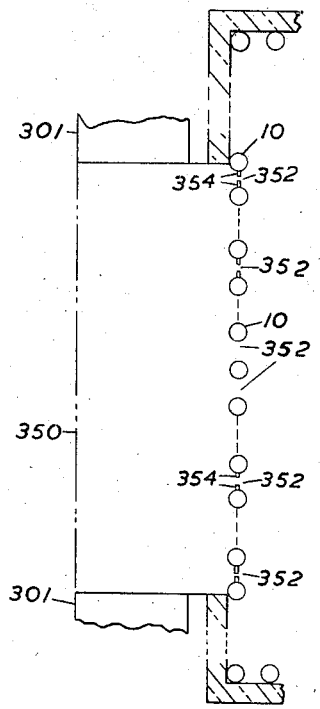
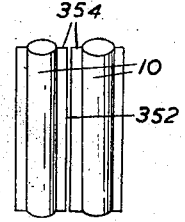
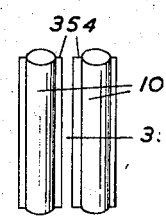
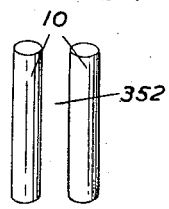
Inventor
Willem F.C.Schaap
By
Attorney

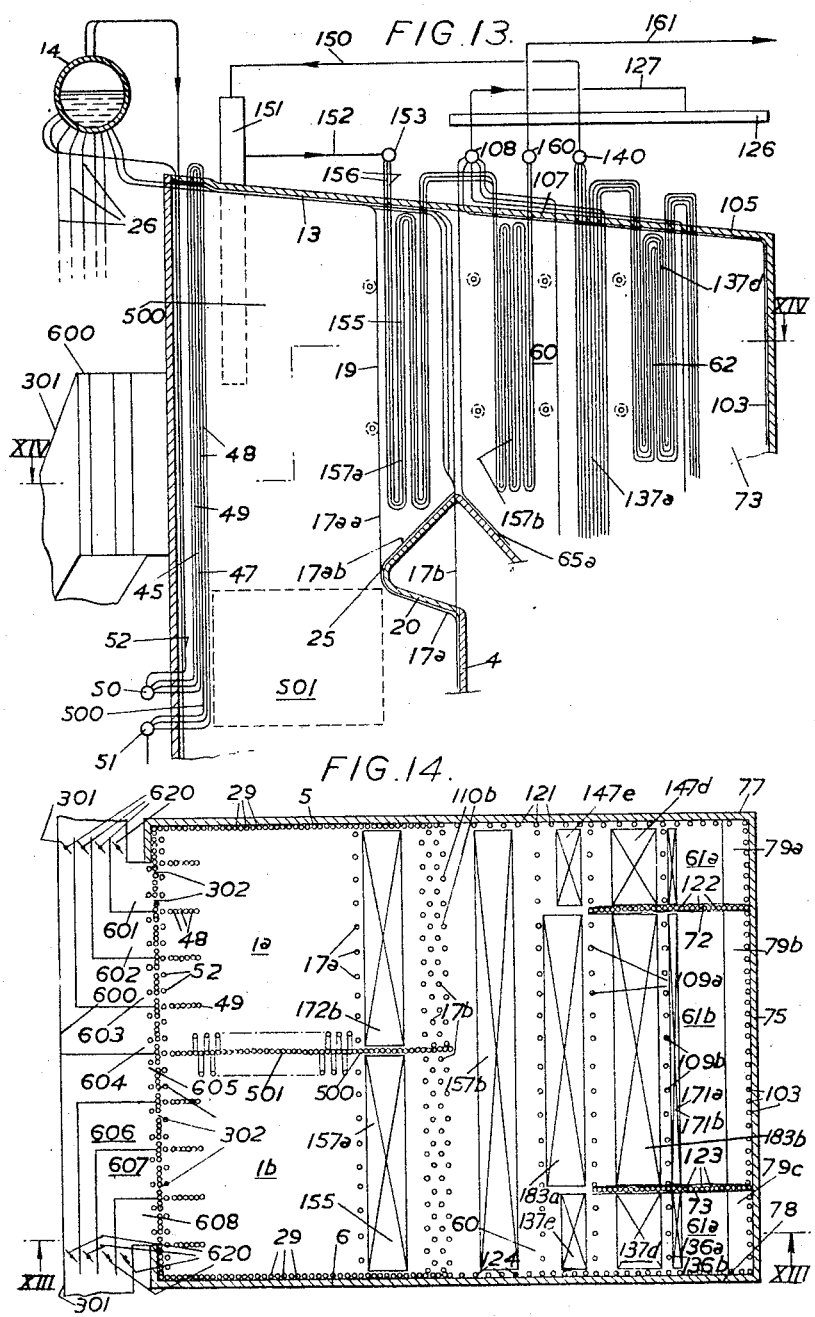

Sept. 22, 1959 W. F. C. SCHAAP 2,905,154
VAPOUR GENERATING AND VAPOUR HEATING UNIT
Filed Jan. 12, 1954 8 Sheets-Sheet 8
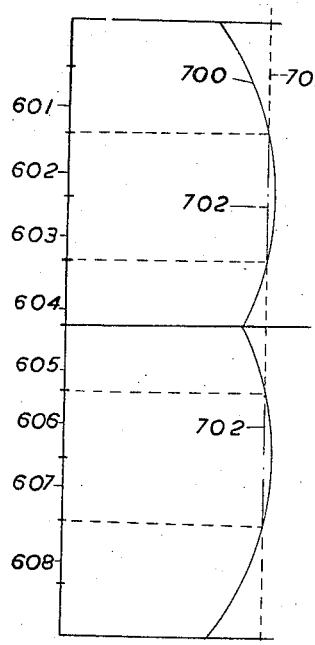
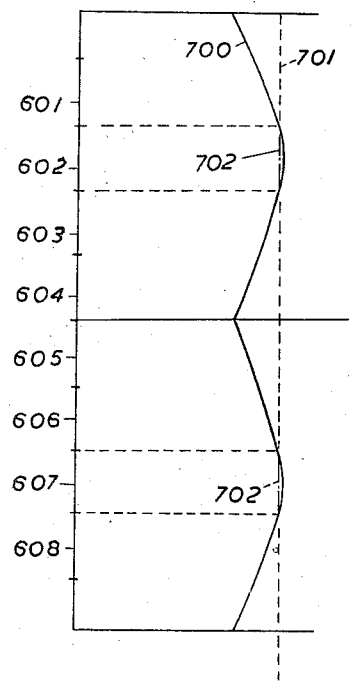
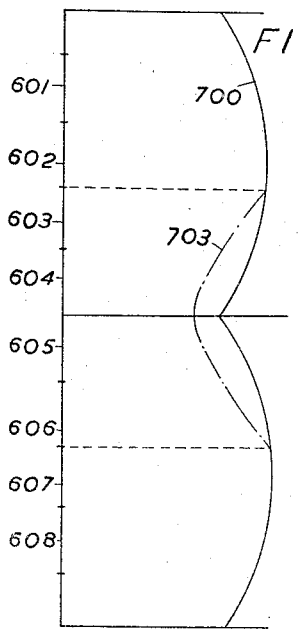
Inventor
Willem F.C.Schaap
By *J.P.Moran*
Attorney United States Patent Office 2,905,154
Patented Sept. 22, 1959

2,905,154

VAPOUR GENERATING AND VAPOUR HEATING UNIT

Willem F. C. Schaap, London, England, assignor to The Babcock & Wilcox Company, New York, N.Y., a corporation of New Jersey Application January 12, 1954, Serial No. 403,504

8 Claims. (Cl. 122—478)

This invention relates to tubulous vapour generating and vapour heating units and to a method of operating such units of the kind having a radiant heat exchange section including tubes lining the walls of a furnace chamber arranged to be fired with fuel the flames from which are partially opaque and a convection heat exchange section arranged to be heated by gases flowing from the furnace chamber. In vapour generating and superheating units adapted to supply vapour at high pressures and temperatures the convection heating surfaces are advantageously designed to operate with high gas inlet temperatures. In the case of furnaces fired with fuels such as coal or oil which give partly opaque flames, radiation to wall cooling tubes is limited and observation has shown that the walls receive heat radiantly from gas layers limited in thickness to about four to ten feet, depending upon the opaqueness of the flame. In a large furnace chamber of substantial cross-section, therefore, the walls are ineffective to cool a central core of the furnace gases and as a result the maximum gas temperature in a central part of the furnace gas stream flowing to the convection section is considerably greater than the gas temperatures prevailing in the region of the gas stream in the neighbourhood of the fluid cooled walls. As a consequence, the effectiveness of the convection heat exchange surfaces is reduced, since if the maximum gas temperature at the inlet to the convection section is limited to that ensuring a safe metal temperature of the parts of the convection heat exchanger contacted by gases at maximum temperature, other parts of the heat exchanger are contacted by gases at temperatures below the maximum permissible temperature. Furthermore, in the event of a unit being fired with fuel the ash of which has an unsuitably low fusion temperature, the relatively high temperature in the central part of the gas stream is liable to lead to serious slagging of the heat exchange surfaces in the neighbourhood of the inlet to the convection section. To reduce the temperature difference across the furnace gas stream resort has been had to the division of the furnace by a wall of vaporising tubes, but such division walls are difficult to clean and a substantial temperature difference across the gas stream has remained.

An object of the invention is the provision of improved means for reducing the temperature in a central part of a furnace gas stream flowing through a convection section. More specific objects are to enable a more uniform temperature across the gas stream at the entry to the convection section to be achieved, to enable slagging of the convection heat exchange surfaces in the neighbourhood of the gas entry to the convection section to be avoided or reduced and the provision of means and a method whereby the rate of heat exchange in a vapour heater may be regulated.

The present invention includes the method of operating a tubulous vapour generating and vapour heating unit of the kind having a radiant heat exchange section including tubes lining the walls of a furnace chamber arranged to be fired with fuel the flames from which are partially opaque and a convection heat exchange section arranged to be heated by gases flowing from the furnace chamber, according to which furnace gases cooled by contact with surfaces of the convection section are recirculated to and mixed with gases in a central part of the furnace gas stream flowing to the convection section in order to reduce the relatively high temperature of gases in that part.

The invention also includes a tubulous vapour generating and vapour heating unit having a furnace chamber with vapour generating wall tubes, a convection section including vapour heating surfaces and means for firing the furnace chamber with fuel the flames from which are partly opaque, wherein means are provided for recirculating to and mixing with gases in a central part of the furnace gas stream flowing to the convection section gases cooled by passing over convection heating surfaces.

The invention will now be described by way of example with reference to the accompanying drawings, in which:

Figure 5 is a sectional plan view taken on the line V—V of Figure 1;

Figure 6 is a sectional front elevation taken on the line VI—VI of Figure 5;

Figure 7 is an enlarged view of part of Figure 3;

Figure 8 is an elevation of one of the apertures in the furnace front wall indicated in Figure 7;

Figure 1:
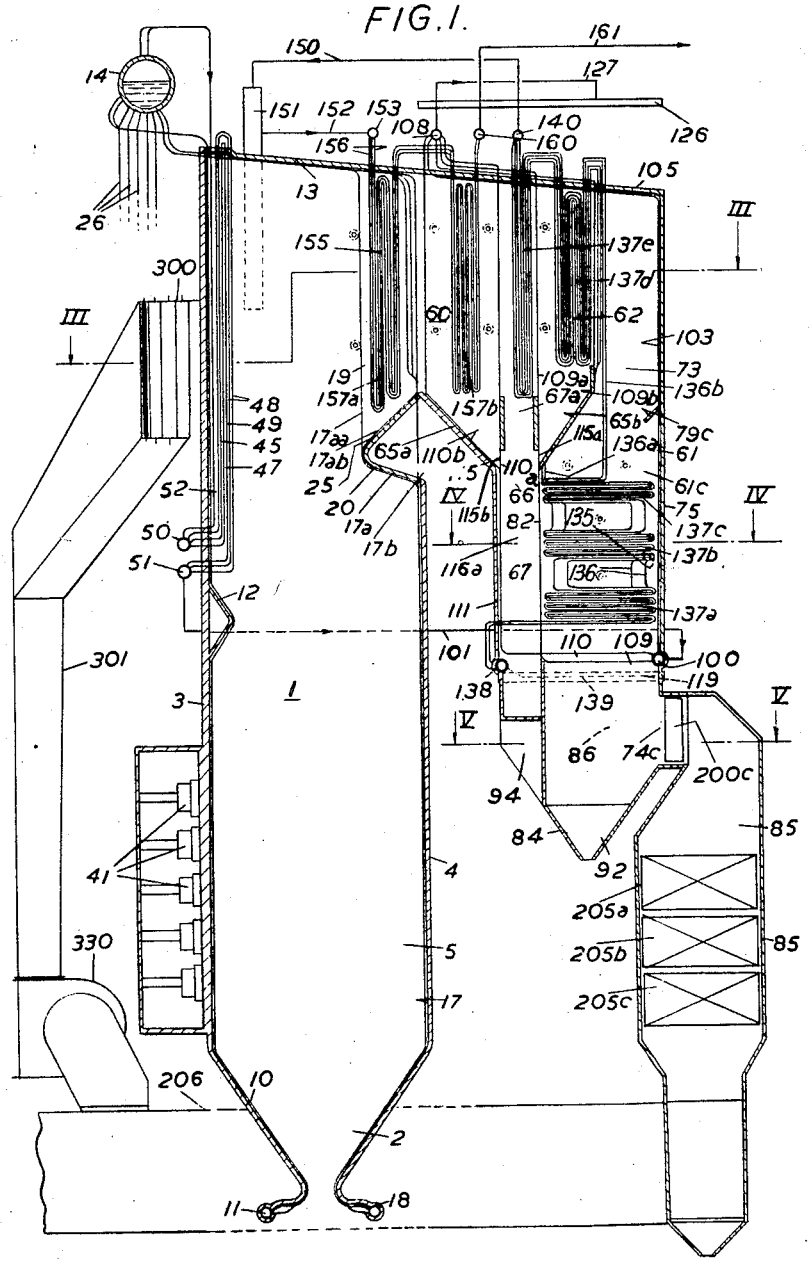
Figure 1 is a sectional side elevation through a steam generating, superheating, and reheating unit, taken on the line I—I of Figure 3 and as viewed in the direction indicated by the arrows.
Figure 2:
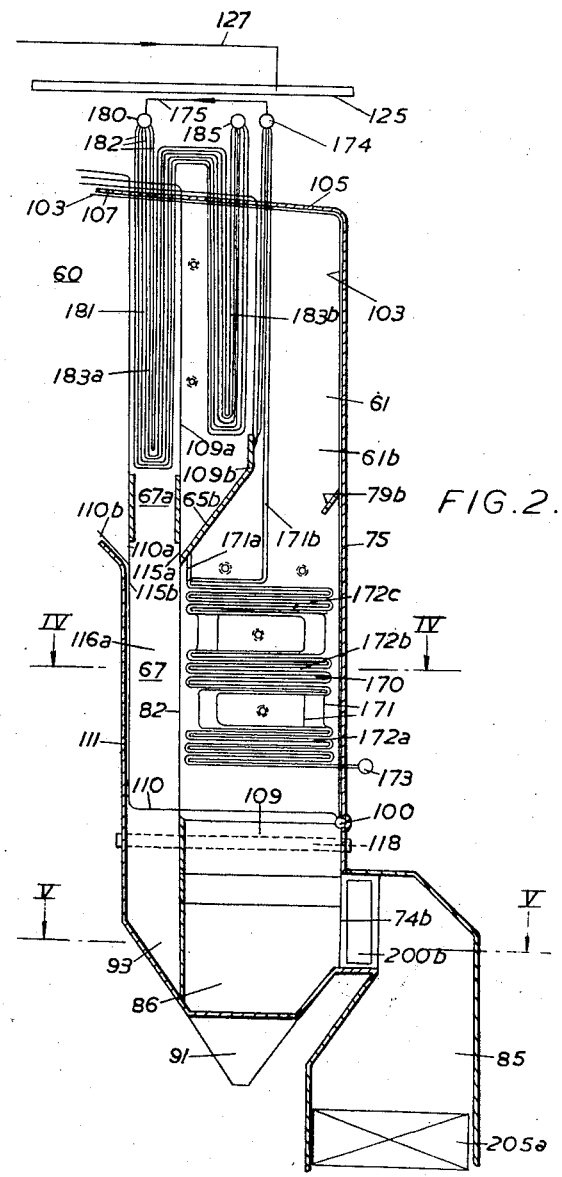
Figure 2 is a sectional side elevation of part only of the unit shown in Figure 1, taken on the line II—II of Figure 3.

Figures 9(a), 9(b), and 10 are diagrams used in the explanation of the operation;

Figure 11 is a diagram illustrating by way of scrap sectional plan views a modified arrangement in the furnace chamber front wall of apertures adapted for discharging cooled gases into the furnace chamber;

Figures 12(a), 12(b), and 12(c) are elevations of some of the apertures referred to in connection with Figure 11;

Figures 13 and 14 illustrate another modification of the unit shown in Figures 1 to 8, Figure 13 being a sectional side elevation through the upper part of the modified unit taken on the line XIII—XIII of Figure 14, and Figure 14 being a sectional plan view of the modified unit taken on the line XIV—XIV of Figure 13; and Figures 15(a), 15(b), and 16 are diagrams used in the explanation of the operation of the modified unit.

Referring to Figures 1 to 7 of the drawings, a vertically elongated furnace chamber 1 of rectangular cross-section is formed with a hopper bottom 2 and has its refractory front wall 3, rear wall 4 and side walls 5 and 6 lined with closely spaced, steam generating, wall cooling tubes. Thus tubes 10 connected at their lower ends to an inlet header 11 line the front wall of the hopper bottom 2, and thence extend vertically upwards to approximately the mid-height of the furnace chamber, where they are bent inwardly to form an arch 12, above which they return to the plane of the lower part of the front wall and continue vertically upwards to the roof 13 of the furnace chamber, through which they extend, the tubes being connected at their upper ends to a steam and water drum 14. Tubes 17 connected at their lower ends to an inlet header 18 line the rear wall of the hopper bottom 2 and thence extend vertically upwards to a level above that of the arch 12, and below that of a lateral gas outlet 19 from the furnace chamber, at which level alternate tubes, designated by 17a, are bent forwardly towards the wall 3 to form an arch 20 which extends across the full width of the furnace chamber and which extends approximately a quarter of the depth of the furnace towards the front wall. The remainder of the tubes 17, designated by 17b, extend vertically upwards as far as the roof 13, at which they are bent forwardly of the furnace chamber and extend towards and through the front wall 3, serving to line the roof 13, and are connected at their upper ends to the steam and water drum 14. Above the arch 20, alternate tubes designated 17aa of the tubes 17a extend vertically upwards to the roof 13, while the remainder of the tubes 17a, designated 17 ab, are inclined rearwardly and upwardly to define an upper surface 25 of the arch 20 and to rejoin the tubes 17b beyond which point they extend vertically as two parallel rows of spaced tubes to the roof 13. The tubes 17aa and 17ab, like the tubes 17b, extend towards and through the front wall 3, serve to line roof 13, and are connected at their upper ends to the water space of the steam and water drum 14.

The side walls 5 and 6 are lined in well known manner with closely spaced steam generating tubes 29 (see Figure 3) connected at their lower and upper ends respectively to inlet and outlet headers (not detailed). The outlet headers are suitably connected by uprisers to the steam and water drum 14 and the inlet headers, as also the headers 11 and 18, are supplied by suitable downcomers, indicated at 26, leading water from the drum 14.

Fuel burners 41 are arranged to discharge pulverised fuel and secondary air into the furnace chamber between the tubes which line the lower part of the front wall 3 below the arch 12.

Arranged adjacent the front wall 3 in the alcove 45 above the arch 12 is a radiant superheater 47 comprising hairpin shaped tubes 48 arranged in groups to form tube platens or panels 49 and with their return bends uppermost and extending through the roof 13 of the furnace chamber, the lower ends of each tube 48 being connected respectively to an inlet header 50 and to an outlet header 51. The inlet header 50 is connected to the steam space of the drum 14 by tubes 52 disposed inside the alcove 45 and positioned on the wall side of the platens 49.

A windbox 300 of length about 70% of the distance between the side walls 5 and 6 and of height about half the height of the gas outlet 19 is arranged symmetrically with respect to the centre line of the unit outside a front wall 3 at a level opposite the lower half of the gas outlet 19. The windbox is arranged to supply cooled gas, delivered to opposite ends thereof by two gas ducts 301, hereinafter referred to, to front wall apertures 302 arranged in a row across the central part of the front wall 3. Each aperture is nearly the height of the windbox and is formed by the displacement forwardly and laterally of one of the tubes 10 of the front wall and is intermediate two of the steam tubes 52.

The apertures 302 are grouped in the row into seven evenly spaced aperture groups 303—309 of which the aperture group 303 is that nearest the side wall 5, the group 309 is that nearest the opposite side wall 6, and the centre group 306 is astride the centre line of the unit. Each group consists of two apertures, as indicated in Figure 7 for the group 306, and the groups 303—309 are supplied by respective sections 310—316 into which the windbox is divided. One of the two ducts 301 is arranged for supplying the three windbox sections nearest the one end of the windbox, and the other of the two ducts 301 is arranged for supplying the three windbox sections nearest the other end of the windbox; the centre windbox section 313 can be supplied by either or both of the two branches 301. Separately operable dampers 320 are provided for controlling the admission of the cooled gases from the ducts 301 to the windbox sections 310—316.

A lateral gas pass 60 extends rearwardly from the gas outlet 19 and communicates at its rearward end with a vertical downpass 61, a rear end portion 62 of pass 60 extending above the downpass 61 across the full width and across practically half the depth of the downpass.

The refractory floor of the part of the lateral gas pass 60 which is rearward of the plane of the furnace rear wall 4 is in the form of a hopper and comprises two parts 65a and 65b respectively on either side of and both downwardly inclined towards a transversely extending opening 66 formed by the upper end of a vertical chute and by-pass 67 disposed at the front side of and extending across the full width of the downpass 61.

The rear end portion 62 of the lateral gas pass 60 and the whole of the downpass 61 are divided by vertical partition walls 72 and 73 (see Figures 3 and 6) to form three parallel-connected gas flow paths extending respectively from a location above the by-pass 67 to three lateral gas outlets 74a, 74b and 74c arranged at the lower end of the downpass rear wall 75. The downpass is thus divided into three parts 61a, 61b and 61c respectively lying between side wall 77 of downpass 61 and the partition wall 72, between the partition walls 72 and 73, and between the partition wall 73 and side wall 78 of the downpass 61. Adjustable deflector plates 79a, 79b and 79c are secured to the wall 75 above the level of the opening 66, the plates extending across the widths of the parts 61a, 61b and 61c of the gas pass 61 respectively and each having an inwardly and downwardly sloping upper surface. A partition wall 82 which serves as the front wall of the downpass 61 and as the rear wall of the by-pass 67 is continued downwardly below the outlets 74a, 74b and 74c to the floor 84 of the downpass 61.

The by-pass 67 is connected to an offset downward extension 85 of the downpass 61 by two tunnels 86 extending through the central part 61b of the downpass 61, and the floor 84 is in the form of a plurality of hoppers disposed side by side across the width of the downpass, separate hoppers 90, 91, 92, 93 and 94 being associated respectively with the downpass parts 61a, 61b and 61c and the two tunnels 86, each of these latter two hoppers being extended sidewardly at its front end so that together they include the whole area below the by-pass 67. The lower ends of the by-pass 67 and the downpass 61 constitute gas turning spaces disposed above the hoppers.

The walls and roofs of the lateral gas pass 60 and the downpass 61 include steam heating, wall cooling tubes. Thus an inlet header 100 connected by a suitable conduit indicated at 101 to the outlet header 51 of the radiant superheater 47 is disposed adjacent the lower end of the rear wall 75 of the downpass 61, and has connected to it spaced tubes 103 which extend vertically upwards to line the rear wall 75, at the top of which they are bent forwardly to line the roof 105 of the downpass 61 and the roof 107 of the part of the lateral gas pass 60 rearwardly of the furnace wall 4, these tubes being bent upwardly adjacent the plane of the wall 4 to extend through the roof 107, above which they are connected to a header 108. Other tubes 109 extend horizontally from the inlet header 100 across the downpass 61 to the partition wall 82, and then extend upwardly to a location adjacent the opening 66 to form, with suitable refractory material, the wall 82. At the opening 66, alternate tubes 109a continue vertically upwards through the gas pass 60 as a screen of spaced tubes and through the roof 107 of that pass, above which they are connected to the header 108. The remainder 109b of the tubes 109 are bent rearwardly and inclined upwardly to help form the part 65b of the floor of the lateral gas pass 60, at the rearmost end of which they are bent upwardly and extend as a screen of spaced tubes upwardly to and through the roof 105 of the downpass 61, above the level of which they are connected to the header 108. Still other tubes, 110, extend horizontally from the inlet header 100 across the downpass 61 and across the by-pass 67 to front wall 111 of the by-pass, and then extend upwardly to line that wall as far as the opening 66, above which alternate tubes 110*a* are continued upwardly across the lateral gas pass 60 as a row of spaced tubes and through the roof 107, above which they are connected to the header 108. The remainder 110*b* of the tubes 110 are bent forwardly above the opening 66 to line the part 65*a* of the floor of the lateral gas pass 60, and adjacent the plane of the wall 4 are bent upwardly to extend as a row of spaced tubes across the lateral gas pass 60 and through the roof 107, above which they are connected to the header 108. Parts of the tubes 109*a* and 110*a* above the opening 66 are covered with refractory material to define an upward extension 67*a* of the by-pass 67 while leaving openings 115*a*, 115*b* between tubes 109*a* and 110*a* respectively for the downward passage into the by-pass or fouling falling on the parts 65*b*, 65*a* respectively of the floor of the lateral gas pass 60.

The upper parts of the side walls 77 and 78, the partition walls 72 and 73 and side walls 116*a*, 116*b* (Fig. 4) of the by-pass 67 are also provided with vapour heating, cooling tubes. Thus headers 117, 118, 119 and 120 (see Figure 6) are disposed in the walls 77, 72, 73 and 78 respectively a short distance above the level of the gas outlets 74*a*, 74*b* and 74*c*, and tubes 121, 122, 123 and 124 extend upwardly from the headers 117, 118, 119 and 120 respectively, tubes 121 and 124 serving to line the walls 77, 116*a*, and 78, 116*b* respectively, and the tubes 122, 123, together with refractory material, constituting the walls 72 and 73. The tubes 121 and 124 which are associated with the forward ends of the walls 77 and 78 and with the walls 116*a*, 116*b* are more closely spaced than the tubes associated with the rearward ends of the walls 77 and 78 (see Figure 4); and above the level of the opening 66, the more closely spaced tubes 121 and 124 diverge from one another in order that they may line not only the side walls of the gas pass 61 and the upward extension 67*a* of the by-pass, but also the whole of the side walls of the part of the lateral gas pass 60 rearward of the plane of furnace wall 4. At their upper ends, the groups of tubes 121, 122, 123 and 124 are connected to headers corresponding to the headers 117, 118, 119 and 120, for example, headers 125 and 126 corresponding to headers 118, 119 respectively. These four upper headers are connected by tubes such as 127 to the header 108.

A convection primary superheater 135 is disposed in the part 61*c* of the downpass 61 and comprises sinuous tubes 136 arranged to lie in three banks 137*a*, 137*b* and 137*c* in the part of the downpass below the level of the opening 66, the lower end of each tube 136 being connected to an inlet header 138 disposed in the front wall 111 of the by-pass 67 and connected by tubes such as 139 to the headers 117, 118, 119 and 120. Adjacent the level of the opening 66, alternate pairs 136*a* of the tubes 136 are bent upwardly adjacent the partition wall 82 and are arranged to lie between the tubes 109*b* to help form the part 65*b* of the floor of the lateral gas pass 60, at the rearmost end of which they are bent upwardly and extend as two rows of spaced tubes across the rearward end of the gas pass 60 to and through the roof 105, above which they are reversely bent and enter the lateral gas pass 60 to form part of a fourth tube bank 137*d* of the primary superheater, disposed above the floor part 65*b*. The remainder 136*b* of the tubes 136 are bent upwardly at approximately the mid-depth of the downpass 61 to extend upwardly as two rows of spaced tubes to and through the roof 105, where they rejoin the tubes 136*a* to form the remainder of tube bank 137*d*.

In the tube bank 137*d*, the tubes 136 are arranged at a pitch across the width of the gas pass equal to twice the pitch of the tube parts in the banks 137*a*, 137*b* and 137*c*, are sinuously bent so that each tube traverses the height of the lateral gas pass several times, and at the forward end of the bank 137*d*, the tubes 136 extend upwardly through the roof 107 and are reversely bent to re-enter the gas pass 60 above the by-pass 67, the tubes being bent to form U-tubes constituting a tube bank 137*e* of the primary superheater. At the forward end of the tube bank 137*e*, the tubes 136 extend upwardly through the roof 107 and are connected to an outlet header 140.

Figure 3:
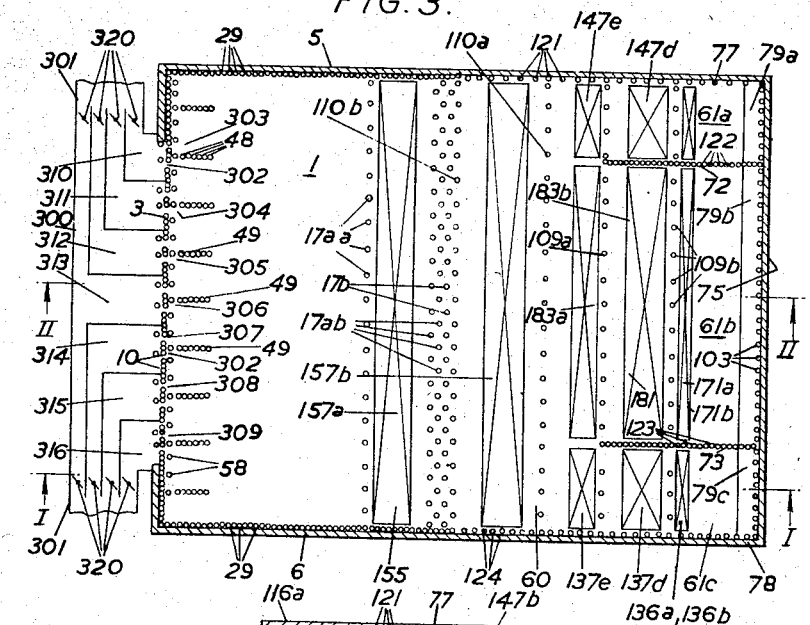
Figure 3 is a sectional plan view taken on the line III—III of Figure 1.
Figure 4:
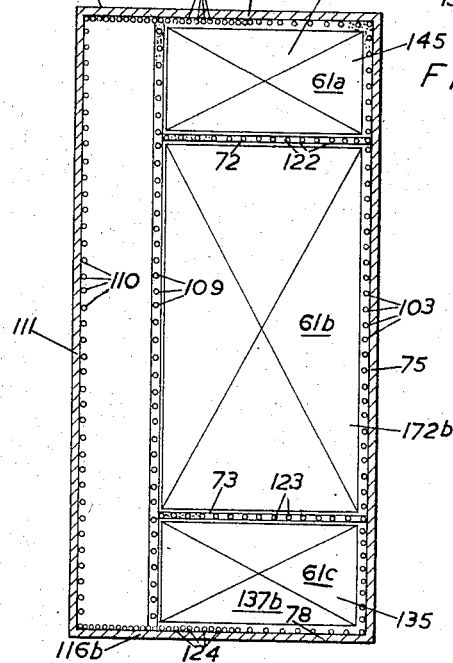
Figure 4 is a sectional plan view taken on the line IV—IV of Figure 1.

A second convection primary superheater 145 is disposed in the part 61*a* of the downpass 61 and like the superheater 135 comprises sinuous tubes arranged to lie in banks similar to the banks 137*a* to 137*e* comprising the primary convection superheater 135. Two of these banks 147*d* and 147*e* corresponding to the banks 137*d* and 137*e* are shown in Figure 3, and two other banks 147*a* and 147*b* corresponding to the banks 137*a* and 137*b* are shown in Figure 6.

The outlet header 140 of superheater 135 and the corresponding outlet header of the superheater 145 are both connected by conduits 150 to an attemperator 151, which may be of any suitable known type, and the outlet for cooled steam from the attemperator is connected by conduits 152 to header 153 serving as the inlet header for a secondary convection superheater 155 comprising sinuous tubes 156, each connected at one end to the header 153. The tubes 156 extend downwardly through the roof 107 and are sinuously bent so that each traverses the height of the lateral gas pass several times to form a first tube bank 157*a* disposed in the part of the lateral gas pass 60 above the arch 20 and between the rows of tubes 17*aa* and 17*ab*. At the rearward end of the tube bank 157*a*, the tubes 156 extend upwardly through the roof 107, and are reversely bent to re-enter the gas pass 60 above the floor part 65*a*, where the tubes are again sinuously bent to form a second tube bank 157*b* disposed in the part of the lateral gas path between the rows of tubes 110*a* and 110*b*. Both the superheater banks 157*a* and 157*b* extend across the full width of the lateral gas pass 60, as indicated clearly in Figure 3. At the rearward end of the bank 157*b*, the tubes 156 extend upwardly through the roof 107 and are connected to an outlet header 160, itself connected by a steam main indicated at 161 to the high pressure stage of an associated turbine, not shown.

A convection primary reheater 170 (Fig. 2) is disposed in the part 61*b* of the downpass 61 and comprises sinuous tubes 171 arranged to lie in three banks 172*a*, 172*b* and 172*c* in the part of the downpass below the level of the opening 66, the lower end of each tube 171 being connected to an inlet header 173 disposed outside the rear wall 75 of the downpass. Adjacent the level of the opening 66, alternate pairs 171*a* of the tubes 171 are bent upwardly adjacent the partition wall 82 and are arranged to lie between the tubes 109*b* to help form the part 65*b* of the floor of the lateral gas pass 60, at the rearmost end of which they are bent upwardly and extend as two rows of spaced tubes across the rearward end of the gas pass 60 to and through the roof 105, above which they are connected to an outlet header 174. The remainder 171*b* of the tubes 171 are bent upwardly at approximately the mid-depth of the downpass 61 to extend upwardly as two spaced rows of spaced tubes to and through the roof 105, above which they are connected to the outlet header 174.

The outlet header 174 is connected by pipes 175 to the inlet header 180 of a convection secondary reheater 181 comprising tubes 182, the spacing of which transversely of the gas pass 60 is about twice the spacing of the parts of tubes 171 in the tube banks 172*a*, 172*b* and 172c transversely of the downpass 61. Each tube 182 is connected at one end to the inlet header 180 and extends downwardly therefrom into the part of the lateral gas pass 60 above the by-pass 67, the tubes being reversely bent at their lower ends so as to form a tube bank 183a. At the rearward end of the bank 183a, the tubes 182 extend upwardly through the roof 107 and are reversely bent to re-enter the gas pass 60 above the floor part 65b, the tubes being reversely bent at their lower ends to form a second tube bank 183b and returning through the roof 107 above which they are connected to an outlet header 185. The inlet header 173 of the primary reheater 170 is connected to the exhaust from a high pressure stage of the associated turbine, while the outlet header 185 from the series connected secondary reheater 181 is connected to the inlet of an intermediate pressure stage of the associated turbine.

The division of the hot gases flowing from the furnace chamber 1 between the parts 61a, 61b and 61c of the downpass 61 and the by-pass 67 is controlled by dampers 200a, 200b and 200c respectively arranged in the gas outlets 74a, 74b and 74c and by dampers 202a and 202b respectively arranged at the rearmost ends of the two tunnels 86.

The offset downward extension 85 of the downpass 61 contains three economiser heat exchange sections 205a, 205b and 205c and is connected at its lower end with a flue 206. The flue is in two parts, one to each side of the furnace setting, and leading the cooled gases forwardly of the setting and first to an air heater (not shown), thence to a grit arrestor (not shown) and induced draft fan (not shown) to a chimney (not shown).

From the two parts of the flue 206 cooled gases can be extracted by respective fans 330 and delivered into the respective gas ducts 301.

During operation of the unit described, pulverised fuel is supplied to the burners 41 and the hot furnace gases pass upwardly through the furnace chamber and through the lateral gas outlet 19 into the lateral gas pass 60, where they pass over the tube banks of the secondary superheater 155. The division of the hot gases between the parts 61a, 61b and 61c of the downpass 61 and the by-pass 67 will depend upon the settings of the dampers 200a, 200b and 200c, 202a and 202b. The deflector plates 79a, 79b and 79c serve to distribute the hot gases over the depths of the gas pass parts 61a, 61b and 61c respectively. From the downpass 61 the hot gases pass downwardly through the extension 85 and into the flue 206 whence they pass to the associated chimney.

Vapour generated in the tubes lining the walls of the furnace chamber 1 is separated from the entraining water in the steam and water drum 14, whence the steam flows through tubes 52 to the radiant superheater 47. From the superheater 47 the steam flows through conduit 101 to the inlet header 100 and thence through the tubes 103, 109 and 110 to the header 108, through tubes 127 to the upper headers such as 125 and 126 associated with the tubes 121, 122, 123 and 124, downwardly through those tubes to the headers 117, 118, 119 and 120 and thence through the tubes 139 to the inlet headers, for example the header 138, of the primary superheaters 135 and 145. The steam flows through the parallel connected primary superheaters 135 and 145, through the conduits 150 to the attemperator 151, and thence through the conduits 152 to the inlet header 153 of the single secondary superheater 155, and finally passes from the superheater through the steam main 161 to the high pressure stage of the associated turbine.

Steam exhausted from the high or an intermediate pressure stage of the steam turbine is supplied to the inlet header 173 of the primary reheater 170, and passes from the outlet header thereof through the pipes 175 to the inlet header of the secondary convection reheater 181, from the outlet header 185 of which it is returned to an intermediate or low pressure stage of the associated turbine.

It is found that the temperature at the entrance to the gas outlet 19 of the gases arising from the combustion in the furnace chamber 1 is not uniform. Although the gases do not rise towards the upper region of the furnace chamber as an undisturbed mass, and although, moreover, the arches 12 and 20 give turbulence to at least the front and rear layers of the gases, and although the gases in addition undergo disturbance in changing their general flow direction in the upper region of the furnace chamber in order to enter the gas outlet 19, nevertheless the gas temperatures in the central parts of the gas stream between the side walls 5 and 6 at the entrance to the gas outlet are greater than the gas temperatures in the parts of the gas stream nearer the side walls 5 and 6. The variation of gas temperature between the walls 5 and 6 at the entrance to the gas outlet 19, at the level where the maximum gas temperature is to be found, may be somewhat as indicated by the continuous line 400 in Figure 9(a), in which gas temperature is plotted against the distance from the wall 6 to the wall 5.

The operation of the unit may be such that the maximum gas temperature indicated in Figure 9(a) may be greater than the maximum temperature at which it is safe, from the point of view of metal temperature, to permit the gases to impinge upon the secondary convection superheater 155. Such a condition will be indicated by the presence of parts of the curve to the right of the dotted line 401, representing the maximum temperature compatible with metal protection. As shown, only a small part of the peak of the temperature curve is to the right of the line 401. In order to correct this condition, one of the fans 330 is then driven, or both of them, to withdraw cooled gases from one or both of the flues 206 and to deliver them to the windbox, the dampers 320 are set so that cooled gases flow only to the centre windbox section 313 (Fig. 3), which can be fed by either or both fans, whence they are discharged through the centre aperture 306. As indicated in Figure 9(a), by supplying the cooled gas through only the centre group of ports in appropriate quantity the curve of gas temperature at the entrance to the gas outlet 19 is flattened in its central region, as indicated by the line 402, so that the gas temperature does not exceed the desired maximum, at positions at the level in question where the gas temperature is already below the desired maximum, however, the temperature is substantially unaffected.

Further windbox sections are brought into use as may be necessary when greater regions of the temperature curve are above the desired maximum, as for instance at higher loads. For generally when the load is increased the gas temperatures tend to rise. Figure 9(b) shows the temperature curve 400 of Figure 9(a) displaced, at a higher load on the unit, to a new position 403, under which circumstances it will be necessary to supply a greater quantity of cooled gases through the centre aperture group, partly because of the increased quantity of fresh furnace gases to be cooled, and partly because of the rise in temperature; and as the temperature is now above the desired maximum in a wider region of the central part of the furnace gas stream, there is brought into use in addition the windbox sections 312 and 314 immediately flanking on each side the centre windbox section 313. By delivering appropriate quantities of cooled gases through the three aperture groups 305, 306, and 307 from the three windbox sections the gas temperature can be controlled so that where it would otherwise be too great, it is reduced to about the desired maximum, as shown by the line 404, but yet the gas temperature is not reduced across the whole distance between the side walls 5 and 6.

Should the gas temperature rise above the desired maximum in a still wider region of the central part of the furnace gas stream, the windbox sections 311 and 315 are next brought into use in addition to the windbox sections 312 to 314; finally, with a yet wider high temperature band, the outermost windbox sections 310 and 316 are used in addition to the windbox sections 311 to 315.

The described gas recirculation protects the tube metal of the secondary superheater section 157a but employs for this purpose only a relatively small quantity of cooled gases. The parts of the superheater section which would otherwise be contacted by gases above the maximum desired temperature are, when the gas recirculation is used, contacted by gases reduced in temperature to the maximum desired, but the gases contacting the remainder of the superheater section are not or not substantially cooled. Thereby the effectiveness of the secondary superheater section and generally of the convection heat exchangers is maintained. The radiation from the gases to the side walls 5 and 6 in the furnace chamber will not or not substantially be affected by the addition of the recirculated gases, since by virtue of the partial opaqueness of the furnace chamber contents it is mainly the condition of the outer lateral gas layers which determine the radiation to these side walls, which layers are not or are very little cooled by the addition of the recirculated cooled gases.

Cooled gas recirculation in the manner described to reduce to about a desired maximum, gas temperatures in the central part of the furnace gas stream which would otherwise rise above the desired maximum may be employed primarily for the reduction or prevention of slagging of the convection heat exchange surfaces; such gas temperature control will incidentally prevent tube metal overheating. The line 401 in Figures 9(a) and (b), which has hitherto indicated the maximum temperature at which the gases can be permitted to impinge upon the secondary superheater section 155 without risk of damaging the metal of the superheater tubes, may now be considered as indicating not a maximum temperature from the standpoint of metal protection, but the maximum temperature at which the gases can be permitted to impinge upon the secondary superheater section 155 and pass to the subsequent convection surfaces in order to avoid or limit the depositing of slag in sticky form. When the gas temperature is reduced as described by adding cooled gases to the combustion gases, the slag suspended in the gases is solidified and thereby rendered capable of passing the various heat absorbing surfaces. Generally, the higher the load, the more cooled gases need to be added and the greater the number of windbox sections required to be used, in the same manner as previously described with reference to metal protection; but in addition, the gas recirculation and the number of windbox sections used will need to be increased upon the use of a fuel having a lower slag solidification temperature, seeing that such use corresponds to a displacement of the line 401 to the left, where a greater width and depth of the temperature curve 400 is now to the right thereof.

Slag solidification is effected by the gas recirculation method described with the employment of only a relatively small quantity of cooled gases, and the maintenance of the maximum effectiveness of the convection heat exchange surfaces.

It has been assumed that the highest gas temperature tends to occur half-way between the side walls, but it is possible, e.g. if, for one reason or another, the firing of the furnace chamber is carried out unsymmetrically, for the highest gas temperature to tend to occur elsewhere than half-way between the side walls. With the aid of the described sectionalised windbox 300 cooling gas may be added at or suitably distributed across the appropriate region of the furnace gas stream to reduce excessive gas temperatures.

In the modification illustrated by Figures 11, 12(a), 12(b) and 12(c), the tubes 10 lining the front wall 3 of the furnace chamber in the upper part thereof are evenly spaced across the wall, for example at a pitch double the tube diameter. The windbox 350 is of similar width and height to the windbox 300 previously described, and is similarly positioned, but it is not sectionalised and cooled gases from the gas ducts 301 connected to the two ends of the windbox can flow freely to all the apertures 352. The apertures are formed in most cases by the gaps between vertical, laterally extending plates 354 welded to the sides of the tubes, but in the case of an aperture or group of apertures at or adjacent the centre line of the wall the plates are omitted. The widths of the plates are such that near the ends of the windbox the apertures are at their narrowest (see Figure 12(a)), and as one proceeds thence more towards the centre line of the wall the apertures increase in width (see Figure 12(b)), until furthermost from the ends of the windbox the plates are omitted (see Figure 12(c)), as mentioned.

With this arrangement, the cooled gases delivered to the windbox will be discharged into the furnace gas stream, in accordance with the widths of the apertures, to the greatest extent at a region adjacent the centre line of the wall, where the apertures are of greatest width, to a less extent between the region and the ends of the windbox, where the apertures are of less width, and to the least extent adjacent the ends of the windbox, where the apertures have the minimum width.

When only the centremost part of the furnace gas stream tends to be above the desired maximum temperature, only a small amount of cooled gases are required for cooling purposes, to which end only a small excess pressure need be established in the windbox; therefore, there enter the furnace chamber through the outer apertures of restricted widths small quantities of gases not effective to have appreciable cooling effects on furnace gases already below the desired maximum temperature.

The manner in which in a particular installation the aperture widths increase from the outer apertures to the central aperture or group of apertures can be determined by experiment, as also the quantity of gases to be recirculated at each load and with the variety of coal being burnt.

During operation of the unit of Figures 1 to 8, the temperatures of superheat and reheat may be controlled by regulation of the quantity of gases flowing through the by-pass 67 upon adjustment of the dampers 202a, 202b, the temperature of reheat may be controlled by operation of the dampers 200a, 200b and 200c to regulate the distribution of gases between the parallel-connected side parts 61a and 61c of the downpass 61 on the one hand and the central part 61b on the other hand. A rapidly effective control of superheat temperature may also be had by means of the attemperator 151.

Recirculation of cooled gases via the windbox 300 provides the possibility of an additional control in connection with steam temperatures. For the addition of cooled gases to the central part of the furnace gas stream entering the gas outlet 19 effects a lowering of the temperatures of the gases flowing over the reheater surfaces, which lie in the centre one of the three parallel-connected gas passes. The cooled gases do not cool or do not cool to the same extent the laterally outer parts of the gas flow entering the gas outlet 19 and no or very much less gas temperature reduction is appreciable in the gases impinging upon the superheater sections 137e and 147e, lying in the side passes of the three parallel-connected gas passes.

That quantity of cooled gases which is recirculated for the purpose of controlling the relation between reheat and superheat temperatures should preferably not be added via the outermost windbox sections 310 and 316, since cooled gases from the corresponding aperture groups 303 and 309 can readily enter the superheater sections 137e and 147e. Preferably such gases should be supplied only via the three most central windbox sections 312 to 314. As their quantity may be in excess of the quantity required to flatten out the gas temperature curve over the corresponding region, the temperature in said region may be depressed; a depression of temperature in the central region of the furnace gas stream entering the gas outlet 19, when only the three central windbox sections 312 to 314 are in use, may be as shown in Figure 10, where the gas temperature curve 400 has its peak replaced by a depression 405.

Figures 13 and 14 illustrate a modification of the unit of Figures 1 to 8, in which the furnace is divided into two furnace chambers 1a and 1b by a vertical division wall 500 which extends from top to bottom of the furnace space and in the main part of the furnace space extends from front wall 3 to the rear wall 4 and in the upper part of the furnace space from front wall 3 to the rear of the gas outlet 19, dividing the secondary superheater section 157a. The division wall is formed by closely spaced steam generating tubes connected into the natural circulation system of the steam and water drum 14, and extending between suitable upper and lower headers (not shown). Half of the pulverised fuel firing means fire one and the other half of the pulverised fuel firing means fire the other of the furnace chambers. The division wall is closed over most of its area but over a region 501 forwardly of and below the arch 20 the alternate constituent tubes are bent into the furnace chamber 1a and the others of its constituent tubes are bent into the furnace chamber 1b, whereby gases may flow from one furnace chamber to the other in the case of a difference of pressure therebetween.

The reference numeral 1a denotes the furnace chamber bounded laterally by the side wall 5 and the division wall 500 and the reference numeral 1b denotes the furnace chamber bounded laterally by the division wall 500 and the side wall 6.

For the admission of cooled gases to the furnace gas stream in the upper regions of the furnace chambers, a windbox 600 is provided which has the same position as the windbox 300 described with reference to Figures 1 to 7 and similarly is capable of leading cooled gases to groups of apertures 302 spaced along the furnace front wall 3, but the sectionalisation of the windbox 600 differs from that of the windbox 300. Eight windbox sections 601 to 608, associated with respective groups of apertures, are employed, of which sections 601 to 604 can discharge into the upper region of the furnace chamber 1a cooled gases from one of the gas ducts 301, and sections 605 to 608 can discharge into the furnace chamber 1b, cooled gases from the other gas duct 301, the ducts 301 being arranged to receive gases from respective flues and fans similar to the flues 206 and fans 330 of Figure 1. The windbox sections 601 and 608 are those next to the respective side walls 5 and 6, but the apertures through which they can discharge cooled gases are spaced from these walls. The sections 602 and 607 are symmetrically arranged in relation to the respective centre lines of the furnace chambers 1a and 1b. The section 604 can discharge cooled gases through apertures adjacent one side, and the section 605 can discharge cooled gases through apertures adjacent the other side, of the division wall 500. Separately operable dampers 620 respectively associated with the windbox sections 601 to 608, are provided for controlling the admission of cooled gases to the windbox sections.

The division wall 500 provides heat absorbing surface additional to that of the front wall 3, rear wall 4 and side walls 5 and 6 of the furnace and for the same rate of firing the gases carry less heat from the furnace than if the division wall were absent. It is found that the gas temperature at the entrance to the gas outlet 19 is not uniform. The temperature tends to be higher midway between the side wall 5 and the division wall 500, and also midway between the division wall 500 and the side wall 6, and may be somewhat as shown by the line 700 in Figure 15(a), in which gas temperature at the entrance to the gas outlet 19, at a level where the maximum temperature is to be expected, is plotted against distance from the wall 6 to the wall 5. If the operation of the unit is such that the maximum gas temperatures near the outlet 19 are greater than the maximum temperature at which it is considered safe from the point of view of metal temperature to permit the gases to impinge upon the secondary convection superheater 157a, then by recirculating an appropriate quantity of cooled gases via windbox sections discharging in central parts of the upper regions of the furnace chambers, the peaks of the temperature curve can be flattened out and the gases maintained at a safe temperature. For example if the maximum desired temperature is denoted by the line 701, then by recirculating cooled gases via the windbox sections 602 and 607, central to the two furnace chambers, the temperature curve may be caused to take the line 702. In other cases it may be necessary to recirculate gases via additional windbox sections. For example, generally when the load is increased the gas temperatures tend to rise, and then in order to prevent the gas temperature rising above the safe value it may be necessary both to supply a greater quantity of cooled gases via the windbox sections 602 and 607 and also to supply cooled gas via the windbox sections 601 and 603 next adjacent to the windbox section 602, and via the windbox sections 606 and 608 next adjacent the windbox section 607, in order to flatten the now wider and deeper parts of the temperature curve to the right of the line 701. The flattening of a wider and deeper temperature peak has been explained with reference to Figure 9(b).

Whereas for clearing deposits from the side walls 5 and 6 retractable soot blowers (not shown) can be provided, since the walls 5 and 6 are accessible from the outside, the use of such means is impracticable in the case of the division wall 500 and although other means are available, it may be acceptable to permit the efficiency of the division wall to vary. Deposits on the division wall reduce the heat absorption thereby and the gas temperatures at the entrance to the gas outlet 19 may rise adjacent the division wall 500 in comparison with the temperatures adjacent the side walls 5 and 6, for example as shown in Figure 15(b), in which each peak of the temperature curve is displaced towards the division wall. It may then be necessary to supply cooled gases on the one side of the division wall 500 via the windbox sections 602 and 603 instead of only via the windbox section 602, and on the other side of the division wall 500 via the windbox sections 606 and 607 instead of only the windbox section 607. When the load is sufficiently increased, the gases flowing from the regions adjacent the division wall may assume too high a temperature and then it may be necessary to supply cooling gas through all the windbox sections 601 to 608, i.e. including the windbox sections 604 and 605 adjacent the division wall, in order to bring the gas temperatures down to the maximum desired temperature.

When the prevention or reduction of slagging that might otherwise occur in connection with convectively heated surfaces, is primarily sought, in the case of firing with coal of a low ash fusion temperature, similar considerations apply, the line 701 being taken to represent the maximum desired temperature from the point of view of slagging.

Alternatively, cooled gases may be recirculated for the purpose of varying the relation between reheat and superheat temperatures, and in this case the cooled gases are introduced in desired quantity so far as possible through the windbox sections 604 and 605 most centrally disposed in the unit, and the windbox sections 603 and 606 next adjacent thereto, in order to ensure so far as possible that no or only a relatively small mixing of cooled gases takes place with the fresh gases destined to pass into the side passes of the three parallel-connected gas passes, in which superheater sections lie. For example, the gas temperatures may be reduced in the central part of the furnace so that the gas temperature curve assumes a form 703 (see Figure 16).

The recirculation of cooled gases to the furnace gas stream of a tubulous vapour generating and vapour heating unit has been described with reference to the passage of the cooled gases through one of the furnace walls, but it may be advantageous to supply cooled gases through more than one furnace wall for the purpose of reducing the relatively high gas temperatures tending to occur in parts of the furnace gas stream. Where for example a furnace chamber is fired by firing means discharging downwardly and slightly towards one another from arches in opposite furnace walls, so that the gas streams from the two sets of firing means flow in U-shaped paths and in flowing upwardly contact one another roughly speaking at a plane parallel to and midway between the said walls, cooled gases added e.g. with the aid of respective sectionalised windboxes may usefully be supplied through all the four walls around the furnace part in which flows the combined gas stream from the two sets of firing means, in order to reduce the relatively high temperatures in part of the furnace gas stream and protect metal or inhibit slagging.

What is claimed is:

1. A tubulous vapor generating and vapor heating unit having a furnace chamber with vapor generating wall tubes constituting a radiant heat zone, means constituting a lateral gas pass leading rearwardly from an upper part of the furnace chamber and containing a part of a convection section, a convection section including vapor heating tubes, means below said upper part of the furnace chamber for firing the furnace chamber with fuel and flames from which are partly opaque, means for withdrawing heating gases from the convection section after loss of heat therefrom to the vapor heating tubes, means for recirculating the withdrawn gases to and mixing them with unrecirculated gases in the radiant heat zone and in a central part of the furnace gas stream flowing to the convection section, the gas recirculating means including outlet ports through a central part of the front wall of the furnace chamber facing the inlet of the lateral gas pass, and a radiant vapor superheater having tubes screening the upper part of the furnace chamber front wall adjacent said ports.

2. A tubulous vapor generating and vapor heating unit having a furnace chamber with vapor generating wall tubes constituting a radiant heat zone, means constituting a lateral gas pass leading rearwardly from an upper part of the furnace chamber and containing a part of a convection section, a convection section including vapor heating tubes, means below said upper part of the furnace chamber for firing the furnace chamber with fuel the flames from which are partly opaque, means for withdrawing heating gases from the convection section after loss of heat therefrom to the vapor heating tubes, and means for recirculating the withdrawn gases to and mixing them with unrecirculated gases in the radiant heat zone and in a central part of the furnace gas stream flowing to the convection section gases cooled by passing over convection heating surfaces, the gas recirculating means including a windbox having outlet ports of different free flow areas distributed across the part of the front wall of the furnace chamber facing the inlet of the lateral gas pass, the outlet ports at the central portion of said front wall having a greater free flow area than any of the remaining outlet ports.

3. A tubulous vapor generating and vapor heating unit having a furnace chamber with vapor generating wall tubes constituting a radiant heat zone, means constituting a lateral gas pass leading rearwardly from an upper part of the furnace chamber and containing a part of a convection section, a convection section including vapor heating tubes, means below said upper part of the furnace chamber for firing the furnace chamber with fuel the flames from which are partly opaque, means for withdrawing heating gases after loss of heat therefrom in the vapor heating, and means for recirculating the withdrawn gases to and mixing with unrecirculated gases in the radiant heat zone and in a central part of the furnace gas stream flowing to the convection section, the gas recirculating means including a windbox having outlet ports of different free flow areas distributed across a central part of the front wall of the furnace chamber facing the inlet of the lateral gas pass, the ports being formed between wall tubes at least some of which are provided with outwardly extending plates reducing or determining the free flow areas of the ports, the ports of the front wall most remote from the adjacent side walls having the largest free flow areas.

4. In a high capacity vapor generating and superheating unit, means including vapor generating wall tubes defining a furnace chamber in which heat is radiantly transmitted from high temperature combustion products to the wall tubes, a convection section including a vapor superheater disposed in a gas flow path leading from the furnace chamber, means for conducting generated vapor from the furnace wall tubes to the superheater, fuel burning means normally supplying the furnace chamber with high temperature gases, an upright division wall of vapor generating tubes separating two parts of the furnace chamber in parallelism with gas flow from all of said fuel burning means to the convection section, and a gas recirculation system including a fan and ductwork with an inlet downstream of the superheater and outlets on opposite sides of the plane of the division wall adapted to direct recirculated gases along opposite sides of the division wall simultaneously.

5. A natural circulation vapor generating, superheating and reheating unit comprising upright front, rear and side walls defining a vertically elongated furnace chamber of rectangular horizontal cross-section having a gas outlet in its upper rear wall portion, means for burning fluid fuel in suspension in the lower part of said furnace chamber, means forming a laterally extending convection heating pass arranged to receive high temperature heating gases from said gas outlet, means dividing a portion of said heating pass into side-by-side sections, a bank of vapor reheating tubes positioned in one of said sections, a bank of vapor superheating tubes positioned in another section, and means for controlling the heating gas temperature at said furnace chamber outlet including a series of transversely spaced gas inlet ports in the front wall of said furnace chamber extending substantially across the width thereof at an elevation above said fuel burning means and opposite to said heating gas outlet, means for withdrawing relatively cool heating gases from said heating pass downstream of said vapor reheating and superheating tube banks and introducing the withdrawn gases into the furnace chamber through said gas inlet ports, and means providing a greater gas flow through a gas inlet port opposite to the heating pass section containing said bank of vapor reheating tubes.

6. A natural circulation vapor generating, superheating and reheating unit comprising upright front, rear and side walls defining a vertically elongated furnace chamber of rectangular horizontal cross-section having a gas outlet in its upper rear wall portion, means for burning fluid fuel in suspension in the lower part of said furnace chamber, means forming a laterally extending convection heating pass arranged to receive high temperature heating gases from said gas outlet, means dividing a portion of said heating pass into three side-by-side sections, a bank of vapor reheating tubes positioned in the middle section, a bank of vapor superheating tubes positioned in each of the remaining sections, and means for controlling the heating gas temperature at said furnace chamber outlet including a series of transversely spaced gas inlet ports in the front wall of said furnace chamber extending substantially across the width thereof at an elevation above said fuel burning means and opposite to said heating gas outlet, means for withdrawing relatively cool heating gases from said heating pass downstream of said vapor reheating and superheating tube banks and introducing the withdrawn gases into the furnace chamber through said gas inlet ports, and means providing a greater gas flow through the gas inlet port opposite to the heating pass section containing said bank of vapor reheating tubes.

7. A natural circulation vapor generating, superheating and reheating unit comprising upright front, rear and side walls defining a vertically elongated furnace chamber of rectangular horizontal cross-section having a gas outlet in its upper rear wall portion, means for burning fluid fuel in suspension in the lower part of said furnace chamber, vapor generating tubes lining the walls of said furnace chamber, means forming a laterally extending convection heating pass arranged to receive high temperature heating gases from said gas outlet, means dividing a portion of said heating pass into three side-by-side sections, a bank of vapor reheating tubes positioned in the middle section, a bank of vapor superheating tubes positioned in each of the remaining sections, and means for controlling the heating gas temperature at said furnace chamber outlet including a series of transversely spaced gas inlet ports in the front wall of said furnace chamber extending substantially across the width thereof at an elevation above said fuel burning means and opposite to said heating gas outlet, a windbox extending across said front wall and having sections separately enclosing each of said gas inlet ports, means for withdrawing relatively cool heating gases from said heating pass downstream of said vapor reheating and superheating tube banks and introducing the withdrawn gases into the furnace chamber through said windbox, and means providing a greater gas flow through the gas inlet port opposite to said middle heating pass section including means for independently controlling the gas flow through each of said windbox sections.

8. A natural circulation vapor generating, superheating and reheating unit comprising upright front, rear and side walls defining a vertically elongated furnace chamber of rectangular horizontal cross-section having a gas outlet in its upper portion, a row of vertical vapor generating tubes defining a vertical division wall arranged to divide said furnace chamber into two side-by-side sections, means for burning fluid fuel in suspension in the lower part of each of said furnace chamber sections, vapor generating tubes lining the remaining walls of said furnace chamber sections, means forming a laterally extending convection heating pass arranged to receive high temperature heating gases from both of said furnace chamber sections through said gas outlet, means dividing a portion of said heating pass into three side-by-side sections, a bank of vapor reheating tubes positioned in the middle section, a bank of vapor superheating tubes positioned in each of the remaining sections, and means for controlling the heating gas temperature at said furnace chamber outlet including a series of transversely spaced gas inlet ports in the front wall of said furnace chamber sections extending substantially across the width thereof at an elevation above said fuel burning means and opposite to said heating gas outlet, means for withdrawing relatively cool heating gases from said heating pass downstream of said vapor reheating and superheating tube banks and introducing the withdrawn gases into both of said furnace chamber sections through said gas inlet ports, and means providing a greater gas flow through the gas inlet port opposite to said middle heating pass section including means for independently controlling the gas flow through each of said gas inlet ports.

References Cited in the file of this patent

UNITED STATES PATENTS

| | | |
|---|---|---|
| 1,933,020 | Leamon | Oct. 31, 1933 |
| 2,781,746 | Armacost et al. | Feb. 19, 1957 |

FOREIGN PATENTS

| | | |
|---|---|---|
| 499,583 | Belgium | Dec. 15, 1950 |
| 514,687 | Belgium | Oct. 31, 1952 |
| 515,878 | Belgium | Dec. 15, 1952 |
| 955,787 | France | July 4, 1949 |
| 373,860 | Great Britain | June 2, 1932 |
| 504,114 | Great Britain | Apr. 14, 1939 |
| 516,070 | Great Britain | Dec. 21, 1939 |
| 523,870 | Great Britain | July 24, 1940 |
| 371,985 | Italy | June 12, 1939 |
| 661,776 | Great Britain | Nov. 28, 1951 |

OTHER REFERENCES

Mechanical Engineering, vol. 74, No. 10, October 1952, pages 797–802.

Mechanical Engineering, vol. 74, No. 11, November 1952, pages 878–884.